Figure 1:
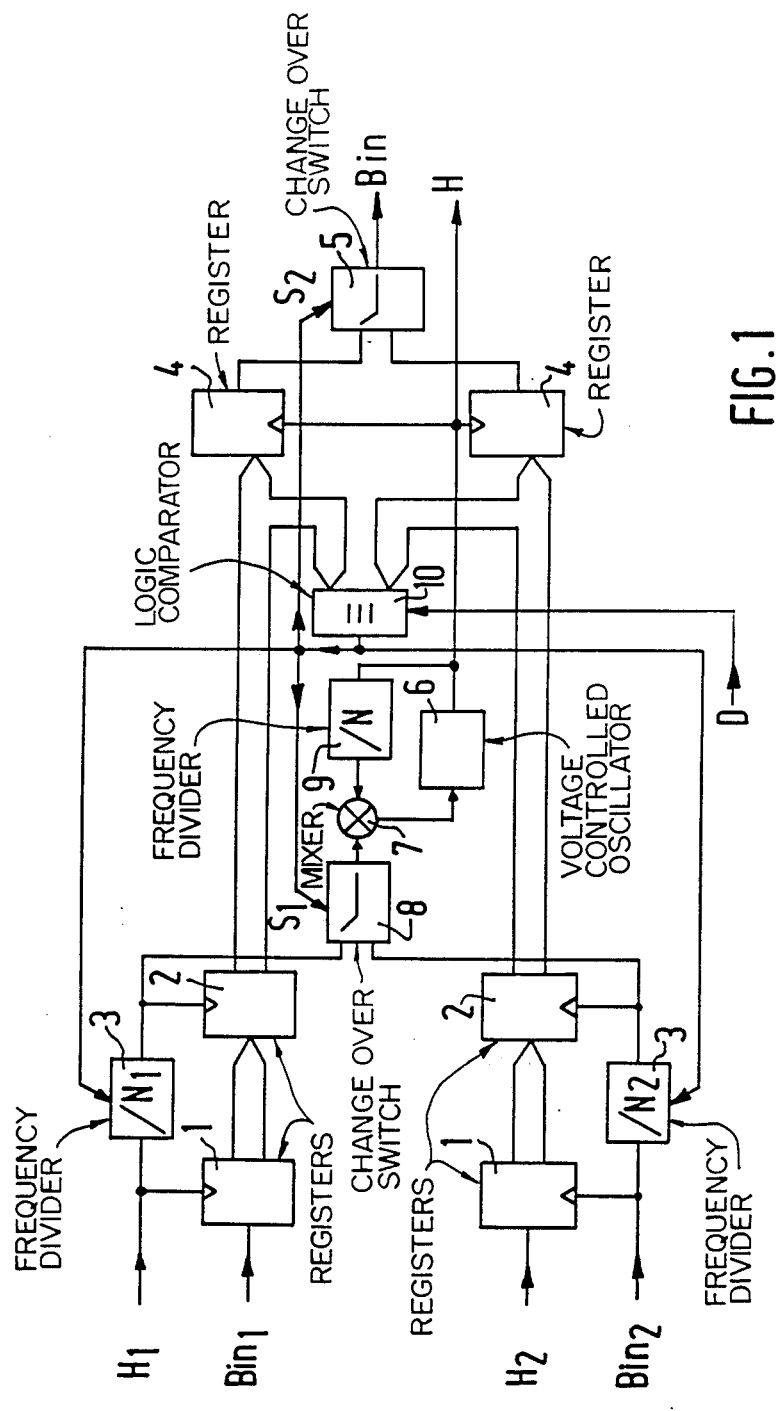

United States Patent [19]

Cornet et al.

[11] Patent Number: 4,744,095
[45] Date of Patent: May 10, 1988

[54] DIVERSITY CHANNEL DATA RECEIVER WITH AUTOMATIC ALIGNMENT OVER A ±3.5-BIT RANGE

[75] Inventors: Jean-François R. Cornet; Patrick Clément, both of Brive, France

[73] Assignee: Telecommunications Radioelectriques et Telephoniques T.R.T., Paris, France

[21] Appl. No.: 895,528

[22] Filed: Aug. 11, 1986

Related U.S. Application Data

[63] Continuation of Ser. No. 658,087, Oct. 5, 1984, abandoned.

[30] Foreign Application Priority Data

Oct. 7, 1983 [FR] France ................ 83 15989

[51] Int. Cl.⁴ ........................ H04L 1/02
[52] U.S. Cl. ........................ 375/100; 455/135
[58] Field of Search ........... 375/40, 100, 102; 455/133, 135, 277; 371/67, 68; 340/825.03

[56] References Cited

U.S. PATENT DOCUMENTS

| | | | |
|---|---|---|---|
| 3,975,687 | 8/1976 | Tan et al. | 455/133 |
| 4,349,914 | 9/1982 | Evans | 455/135 |
| 4,417,348 | 11/1983 | Abbruscato | 375/100 |

Primary Examiner—Robert L. Griffin
Assistant Examiner—Marianne Huseman
Attorney, Agent, or Firm—David R. Treacy

[57] ABSTRACT

An arrangement ensuring the change-over of two channels through which the same digital information is conveyed with automatic data alignment over a ±3.5 bit range comprises for each channel an array of buffer stores operating at a write rate $H_i/N_i$ (where i=1, 2), an oscillator operating at a rate H which provides reading of the buffer stores at the rate H/N and being synchronized in phase-opposition with one or the other of the write rates, and a logic comparator controlling the write rates $H_i/N_i$, the routing of the write rates to the input of the oscillator, as well as a change-over switch for the data.

In the buffer store of the channel assumed to be the one whose quality degrades, the data are converted into N parallel streams at the rate $H_2/N$ and are read at the rate H/N of the oscillator. In the other channel, the write rate of the buffer store is forced to the rate $H_1/N-1$, the read rate remaining unchanged, until there is a coincidence of N bits in the two channels; thereupon the data stream is switched, the write rate is locked at $H_1/N$ and this write rate is applied to the oscillator.

9 Claims, 2 Drawing Sheets

DIVERSITY CHANNEL DATA RECEIVER WITH AUTOMATIC ALIGNMENT OVER A ±3.5-BIT RANGE

This is a continuation of application Ser. No. 658,087, filed Oct. 5, 1984, now abandoned.

BACKGROUND OF THE INVENTION

The invention relates to an arrangement ensuring the automatic correction of the relative positions of data signals transmitted via two channels through which the same digital information is conveyed and more particularly, to diversity data transmission in which, because of unpredictable variations in the channel paths, either channel may have a relative phase delay which may amount to a few bits. After correction, a switch may be commanded from the lesser-quality channel to the higher-quality channel. Each of these channels is connected to the write input of a buffer store and the write clocks for each of said channels is the input clock of each channel. The read clock of each buffer store is aligned with the aid of a phase locked loop on the write clock of the higher-quality channel.

Such an arrangement can be used each time the same digital information is transmitted through two different channels in order to ensure an improved reliability of the transmission.

On transmission, a coupler or a separator routes the information to the channels. On reception, external evaluation criteria are applied to a logic circuit which determines the choice of the higher-quality channel; the problem then arising is how to effect a switch from one channel to the other without loss of information.

This arrangement is used more specifically for transmission via microwave links in diversity-reception systems, which are based on the hypothesis that the probability that two transmission channels fail simultaneously is very low. The sole auxiliary channel, common to n normal channels (n usually being equal to 7), conveys the information of the channel which degrades at a given instant. When this channel improves again, the auxiliary channel is released, so that it can again be temporarily substituted for another failing channel.

The binary information processing equipment located downstream of the switching arrangement (for example automatic switching networks in the case of telephone transmission) synchronize themselves with the signal itself. But the propagation times of the same information transmitted over two different transmission channels are not absolutely identical; there is a delay difference between the two data streams which depends on the atmospheric conditions and which is larger for greater information rates (from 2 Mbits/s to 140 Mbits/s). This delay difference may be sufficient to introduce, on reception, an additional transition in the clock signal and a shift between the respective information streams transmitted over the two channels which may fluctuate by several bits. At the instant the switch from one channel to the other is effected, the message is truncated and one portion is transmitted over the first channel and an other portion is transmitted over the second channel. When no precautions are taken, a discontinuity occurs in the message due to the fact that bits got lost or were added. The result is that all the material downstream has lost its synchronization. This causes the loss of a considerable number of bits.

In order to obviate these disadvantages several channel switching arrangements have been proposed, for example the arrangement described in European Patent Application No. 0 060 751, which comprises inter alia the buffer memory associated with each channel as mentioned above. In this arrangement, the duration of the transmitted data is prolonged in a ratio of 1:n before the switch from one channel to the other is effected, this switch therefore taking place at the level of fictive data, that is to say data whose duration is n times longer than that of the real data. This results in a comparatively complicated structure for the buffer store. In addition, with respect to the phase shift commands, counting the divergences is performed with the aid of a measuring window obtained by means of a monostable circuit and fixing a predetermined delay for effecting a phase shift of $2\pi/n$.

SUMMARY OF THE INVENTION

An object of the invention is to enable switching from one channel to the other with a very short delay, without suppressing or adding information over a ±3.5-bit range. Another object is to enable switching to occur at the level of the real data, that is to say at the output of the buffer store, so that this store may be of a simple structure. Thus, it is easier to integrate the switching gate assembly in a smaller semiconductor circuit.

For this purpose, in accordance with the invention the read output of each buffer store is connected to an input of a change-over switch for the data signals. The output read clock is controlled in dependence on the input or write clock of the channel whose information is being used, and is phase-shifted relative to the latter so as to provide between writing into the buffer, and reading out, a time interval which is of a sufficiently long duration to effect the switch to the higher-quality channel. During the time before switching the write clock of an internal store for data in the higher-quality channel is increased, but the read clock for this internal store remains unchanged, so as to remedy in a few bits the phase shift of said data signals between the two channels. The written information for the output of each buffer store is transmitted to a logic comparator which, in response to a current change-over request, controls the internal store write clocks and the position for the change-over switch of the data signals.

BRIEF FIGURE DESCRIPTION

Figure 2:
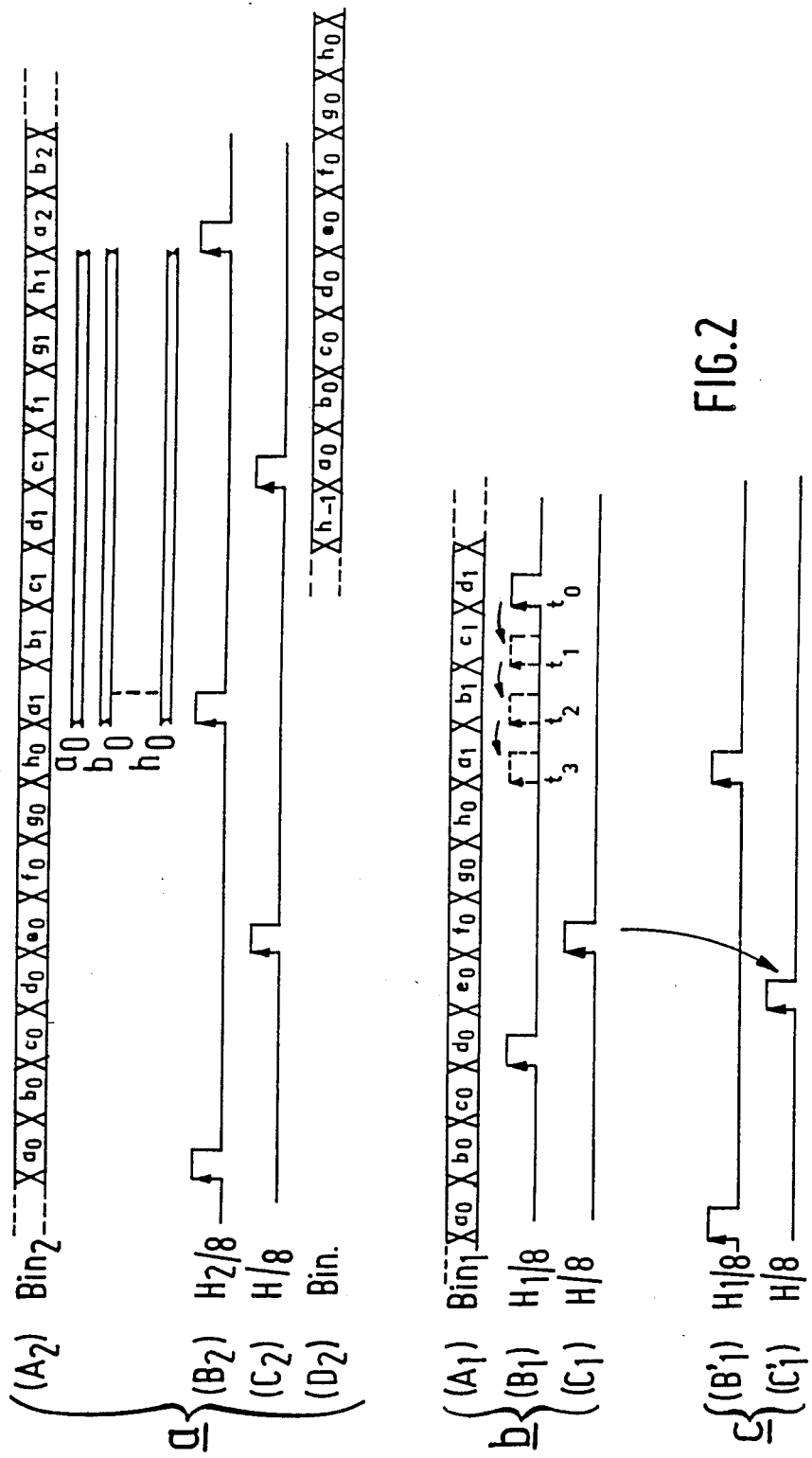

Features of the invention will be more fully appreciated from the following description of an exemplary embodiment when considered in conjunction with the accompanying drawings, in which:

FIG. 1 is a block diagram of the switching arrangement according to an embodiment of the present invention; and FIG. 2 is a time diagram showing several signals appearing in the switching circuit according to the invention.

DETAILED DISCLOSURE OF THE INVENTION

In the block diagram of FIG. 1, two channels convey at a given instant the same digital information with however a phase shift which may amount to a few bits. Each channel carries a bit stream $Bin_i$, where $i=1$ for one of the channels and $i=2$ for the other channel. Criteria external to the switching arrangement are employed to determine which channel is the higher-quality channel.

The arrangement which enables the switch from one channel to the other without loss of information is constituted by:

(1) A buffer store arrangement for each of the two channels. These arrangements comprise two respective input registers 1 which effect a series-to-parallel conversion of $N_i$ bits, and two intermediate parallel-data-storage registers 2. To this end the registers 1 respectively receive the input clock signal $H_i$ of the respective bit stream $Bin_i$ and, via a frequency divider 3, an input register read clock signal which is usually the input clock signal divided by $N_i$. Each intermediate register receives the parallel input which is the output of the related input register resulting from that input register read clock signal; thus that signal becomes the intermediate register's write clock signal. The $N_i$ parallel bits which are usually written at the rate $H_i/N_i$ are transmitted as described below to the input of a register 4 in which a parallel-to-series conversion is effected for reading out the delayed bit stream Bin via a change-over switch 5. Each array of registers 1, 2 and 4 thus constitutes a buffer store.

(2) A phase-locked loop common to the two channels and comprising a voltage-controlled oscillator (VCO) 6 producing an output read clock signal H. The output of oscillator 6 is connected to the registers 4. The output or control signal for the VCO is obtained from a mixer 7, which in turn receives the clock signal $H_i$ divided by $N_i$ via a change-over switch 8, the signal H divided by N via a frequency divider 9. Thus, according to the invention this provides that the operation of oscillator 6 is controlled in dependence on one or the other of the write clocks and that the buffer store output is written at the rate H/N, and read at the rate H.

(3) A logic comparator 10 commanding:

the selected write clock 3 to switch from the normal rate $H_i/N_i$ when, according to the invention, it should be forced to $H_i/(N_i-1)$, the change-over switch 8, for routing the clock signals of the channel whose signals are being used to the input of the phase-locked loop by means of a signal $S_1$, and the change-over switch 5 for routing the data by means of a signal $S_2$ after synchronization has been achieved.

These commands are executed in response to the current switching request D and the written information of the output register of each buffer store transmitted to the comparator 10.

The mode of operation of the switching arrangement according to the embodiment of the present invention will be described with reference to the time diagrams shown in FIG. 2.

The FIGS. 2a and 2b are the respective time diagrams relating to the channels 2 and 1 in their initial states at the instant the switching request is received; FIG. 2c is the time diagram relating to a channel 1 after switching.

Let it be assumed that channel 2 is the channel whose quality is degraded and that a switch to the channel 1, whose quality is better, is desired.

In FIG. 2a the line $A_2$ shows the data of the channel 2, ... $a_{-1}, b_{-1}, ... h_{-1}, a_0, b_0, ... h_0, a_1, b_1 ... h_1, ...$ converted in the buffer store into 8 parallel data streams, ($N_2=8$) at the write rate $H_2/8$ shown at line $B_2$. The line $C_2$ represents the read rate H/8 (N=8) of the voltage-controlled oscillator, which is synchronized in phase opposition with the write rate $H_2/8$ of channel 2. That is, the H/8 pulses occur 180° electrical after the $H_2/8$ pulses, and thus occur mid-way between two successive $H_2/8$ pulses. The line $D_2$ shows the data of channel 2 which are read at the rate $H/8=H_2/8$.

Let it be assumed that the data of channel 1, shown in line $A_1$ of FIG. 2b, have at the input write instant $t_o$ a 1-bit phase lead relative to those of channel 2 and that the write rate $H_1/8$ ($N_1=8$) for the intermediate register 2 of channel 1, shown on line $B_1$ of the same Figure, has a 2-bit phase lag relative to the write rate $H_2/8$ of the intermediate register 2 of the currently used channel, channel 2.

The read rate of the voltage-controlled oscillator is shown on line $C_1$, always in phase opposition relative to the rate $H_2/8$.

Upon the request for a switch from channel 2 to a channel 1, the buffer store intermediate storage waiting function is forced, at the write instant $t_1$, to the write rate $H_1/7$ as shown by the dotted line in the Figure. The read rate for this intermediate register remains unchanged.

The write instant, for transferring data from the input register to the intermediate register of the better quality channel 1 then shifts through one bit at each writing operation ($t_2, t_3, ...$) while transferring the 8 bits received last. In this case there is of necessity one position amongst the 8 possible positions which results in coincidence of these 8 bits between the outputs of the two buffer stores.

This coincidence, which occurs when the intermediate and output write instant in channel 1 appears at the same bit as that for which the write instants appear in channel 2, is obtained after a shift through 3 bits for the case shown in FIG. 2.

The write rate for channel 1 is maintained at $H_1/7$ during the whole search phase during which the data in the parallel register of channel 1 evolve as follows:

| Initial stage | After a shift through 1 bit | After a shift through 2 bits | After a shift through 3 bits |
|---|---|---|---|
| $d_{-1}$ | $c_0$ | $b_1$ | $a_2$ |
| $e_{-1}$ | $d_0$ | $c_1$ | $b_2$ |
| $f_{-1}$ | $e_0$ | $d_1$ | $c_2$ |
| $g_{-1}$ | $f_0$ | $e_1$ | $d_2$ |
| $h_{-1}$ | $g_0$ | $f_1$ | $e_2$ |
| $a_0$ | $h_0$ | $g_1$ | $f_2$ |
| $b_0$ | $a_1$ | $h_1$ | $g_2$ |
| $c_0$ | $b_1$ | $a_2$ | $h_2$ |

The table shows clearly that, because of writing after $N-1$ pulses of what may be considered an 8-bit word, the last bit of one word becomes the first bit of the next. Thus, after 3 shifts, the two output registers will now receive the same words.

Moreover, it is necessary that the delay or advance of this write instant relative to the other write instant does not exceed half the size of the buffer store.

From the moment the coincidence over 8 bits is acquired, the intermediate register write clock signal $H_1/8$ occupies the position represented on line $B'_1$ of FIG. 2c. The following operations are then performed:

switching of the data by means of the change-over switch 5;

locking the intermediate register write rate from the channel 1 divider 3 at $H_1/8$; and applying that write clock signal $H_1/8$ to the mixer 7 for the voltage-controlled oscillator 6 by means of the change-over switch 8.

After the switching operation, the voltage-controlled oscillator slowly returns to a stable position of the intermediate register read instant which is in phase opposition with that register's write instant; this may cause some jitter. This position is shown on line $C'_1$ of FIG. 2c.

Remarks:

1. The switching of the data takes place from the instant at which, for 8 bits, a coincidence between the two paths is detected. Without detracting from the general nature of the invention, a counting device may be added which does not enable the switching of the data until a coincidence over 8 bits has been detected a predetermined number of times.

2. The phase jitter caused when the clock signals are switched can be reduced to any optional low value. Actually, as the jitter does not appear until after switching of the data, it is therefore sufficient to empty a narrow-band loop-filter for the phase-locked oscillator, which will adjust the read clock H/8 to its rest position gradually, over a sufficiently long time.

3. The theoretical alignment range is ±4 bits, but because of the propagation time of the signals through the logic circuits, this range is reduced to ±3.5 bits.

What is claimed is:

1. An arrangement for ensuring the automatic correction of the relative positions of serial data signals transmitted via first and second channels through which the same digital information is conveyed, but with a phase delay which may amount to a few bits, comprising first and second buffer means for storing a given plurality of bits received from the respective channel, each said buffer means comprising a write input for said bits received from the respective channel, and a buffer read output, a respective write clock for each of said channels, each write clock being the input clock for the respective buffer means and providing a respective stream of input clock pulses, and a data signal switch for connecting an arrangement output to the read output of one of said buffer means and, responsive to a command to switch to the other channel, for switching said arrangement output to the read output of the other of said buffer means, characterized in that said first and second buffer means each comprises a storage device having a respective storage read output, and a respective storage write input, and a write generator connected to the respective storage write input for providing a storage write signal in a normal mode dependent on the respective write input, at a respective storage write frequency, each of said generators being selectively operable in a search mode in which the storage write frequency is varied by phase shifting each successive storage write signal, the arrangement further comprising means for comparing one of said read outputs from said first buffer means with the corresponding one of said read outputs from said second buffer means and determining whether or not they are identical, and means, responsive to receipt of a command to switch to the other channel and a determination that said ones of said read outputs are not identical, for switching the generator of said other of said buffer means to the search mode, and returning the generator of said other buffer means to the normal mode upon determination that said ones of said read outputs are identical, and said data signal switch comprises means for switching the arrangement output from being dependent on the storage read output of the one storage device to being dependent on the storage read output of the other storage device, responsive to receipt of a switching command and said determination that said ones of said read outputs are identical.

2. An arrangement as claimed in claim 1, characterized in that each buffer means comprises an input first register and an N-bit second register, said second register being said storage device, and said generators each provide a write clock signal for the respective second register, each generator including a frequency divider which in normal mode provides a write clock pulse for each $N^{th}$ input clock pulse; in the search mode the generator of said other means providing a write clock pulse at each $K^{th}$ input clock pulse, where $N \neq K$.

3. An arrangement as claimed in claim 2, characterized by comprising a read output clock generator, said read output clock generator having a frequency which is dependent on the input clock for the channel from which the read output is being obtained.

4. An arrangement as claimed in claim 3, characterized in that said read output clock generator comprises a voltage controlled oscillator having a control signal input; and a mixer having two inputs and having an output connected to said control signal input, and the arrangement further comprises an output register having a read clock input connected to the output of said read output clock generator, and a write clock input, said read clock input controlling the read output of said register, a switch having an output connected to one input of said mixer, and two inputs respectively connected to receive the write clock pulses of said write generators, and an N:1 frequency divider, receiving the output of said voltage controlled oscillator and providing the write clock input to said output register, and to the other of said mixer inputs.

5. An arrangement for ensuring the automatic correction of the relative positions of serial data signals transmitted via first and second channels through which the same digital information is conveyed, but with a phase delay which may amount to a few bits, comprising first and second buffer means for storing a given plurality of bits received from the respective channel, each said buffer means comprising a write input for said bits received from the respective channel, and a buffer read output, a respective write clock for each of said channels, each write clock being the input clock for the respective buffer means and providing a respective stream of input clock pulses, and a data signal switch for connecting an arrangement output to the read output of one of said buffer means and, responsive to a command to switch to the other channel, for switching said arrangement output to the read output of the other of said buffer means, characterized in that said first and second buffer means each comprises an input register for receiving said data in response to the respective write clock; a storage device having a respective storage read output, and a respective storage write input for controlling writing the data, in the respective input register, into the respective storage device; a write generator connected to the respective storage write input for providing a storage write signal in a normal mode dependent on the respective write input, at a respective storage write frequency, each of said generators being selectively operable in a search mode in which the storage write frequency is varied by phase shifting each successive storage write signal, the arrangement further comprises means for comparing the storage read outputs from said first and second storage devices and determining whether or not they are identical, and means, responsive to receipt of a command to switch to the other channel and a determination that said storage read outputs are not identical, for switching the generator of said other of said buffer means to the search mode, and returning the generator of said other buffer means to the normal mode upon determination that the storage read outputs are identical, and said data signal switch comprises means for switching the arrangement output from being dependent on the storage read output of the one storage device to being dependent on the storage read output of the other storage device, responsive to receipt of a switching command and a determination that said storage read outputs are identical.

6. An arrangement as claimed in claim 5, characterized by comprising two output registers, each forming part of a respective buffer means, means for providing an output read clock signal to said output registers, and means, dependent solely on said output read clock signal, for writing into each output register the contents of the respective storage device.

7. An arrangement as claimed in claim 6, characterized in that each buffer means comprises an input first register and an N-bit second register, said second register being said storage device, and said write generators each provide a write clock signal for the respective second register, each generator including a frequency divider which in normal mode provides a write clock pulse for each $N^{th}$ input clock pulse; in the search mode the generator of said other of said buffer means providing a write clock pulse at each $(N-1)^{th}$ input clock pulse.

8. An arrangement as claimed in claim 7, characterized in that said output clock generator comprises a voltage controlled oscillator having a control signal input; and a mixer having two inputs and having an output connected to said control signal input, and a switch having an output connected to one input of said mixer, and two inputs respectively connected to receive the write clock pulses of said generators, and an N:1 frequency divider, receiving the output of said voltage controlled oscillator and providing the write clock input to said output register, and to the other of said mixer inputs.

9. An arrangement as claimed in claim 8, characterized in that each input first register has an N-bit parallel output connected to the respective N-bit second register; each N-bit second register has a parallel output connected to the respective output register; and the write clock input to said output register is, in steady-state operation, controlled to be in phase opposition to the write clock signal for the second register of the channel to whose output register the arrangement output is connected.

* * * * *

UNITED STATES PATENT AND TRADEMARK OFFICE
CERTIFICATE OF CORRECTION

PATENT NO. : 4,744,095

DATED : May 10, 1988

INVENTOR(S) : Jean-Francois R. Cornet et al

It is certified that error appears in the above-identified patent and that said Letters Patent is hereby corrected as shown below:

Claim 1, line 32  change "comprising" to

--comprises--

Signed and Sealed this

Eleventh Day of October, 1988

Attest:

DONALD J. QUIGG

Attesting Officer

Commissioner of Patents and Trademarks